United States Patent [19]

Oh et al.

[11] 4,440,556
[45] Apr. 3, 1984

[54] OPTICAL FIBER DRAWING USING PLASMA TORCH

[75] Inventors: Shin M. Oh; Dilip K. Nath, both of Roanoke; Pablo C. Pureza, Burke, all of Va.

[73] Assignee: International Telephone and Telegraph Corporation, New York, N.Y.

[21] Appl. No.: 391,273

[22] Filed: Jun. 23, 1982

[51] Int. Cl.³ .......................................... C03B 37/025
[52] U.S. Cl. ............................................ 65/2; 65/12; 65/13
[58] Field of Search ....................... 65/2, 3.12, 12, 13, 65/157

[56] References Cited

U.S. PATENT DOCUMENTS

| Re. 30,883 | 3/1982 | Rau et al. ........................ 65/3.12 X |
| 3,652,248 | 3/1972 | Loxley et al. ..................... 65/2 X |
| 3,990,873 | 11/1976 | Knetzlstorfer ..................... 65/2 |
| 4,030,901 | 6/1977 | Kaiser ........................... 65/2 |
| 4,126,436 | 11/1978 | Bailey ........................... 65/13 |
| 4,349,373 | 9/1982 | Sterling et al. .................... 65/3.12 |
| 4,383,843 | 5/1983 | Iyengar .......................... 65/2 |
| 4,400,190 | 8/1983 | Briere ........................... 65/13 |

FOREIGN PATENT DOCUMENTS

| 52-46825 | 4/1977 | Japan ........................... 65/2 |
| 55-10469 | 1/1980 | Japan ........................... 65/3.12 |

OTHER PUBLICATIONS

Checcacci et al., "R.F. Induction Furnace for . . . Drawing", Electronics Letters, vol. 12, No. 11, May 27, 1976, pp. 265–266.

Primary Examiner—Richard V. Fisher
Attorney, Agent, or Firm—John T. O'Halloran; Peter R. Ruzek

[57] ABSTRACT

In order to provide a high power heat source having a very clean and invariable heat flux, a ring plasma is induced in a heating zone of a plasma torch including a plurality of coaxial tubular elements and the optical fiber is drawn through a channel passing axially through the center of the plasma torch and of the ring-shaped plasma. In this manner the preform from which the fiber is drawn can be placed in close proximity to the induced plasma without exposure to non-symmetrical temperature variations. Cooling gas passes through the heating zone either in an annular stream surrounding the plasma or in an annular stream passing through the center of the plasma around the preform and the fiber being drawn, or both. The heating zone is protected from environmental disturbances by an extension of the outer tubular element of the plasma torch which surrounds the heating zone. The plasma is induced by an RF source in an undisturbed stream of a plasma-forming gaseous medium, such as argon or a mixture of argon with oxygen, which flows through the heating zone.

27 Claims, 3 Drawing Figures

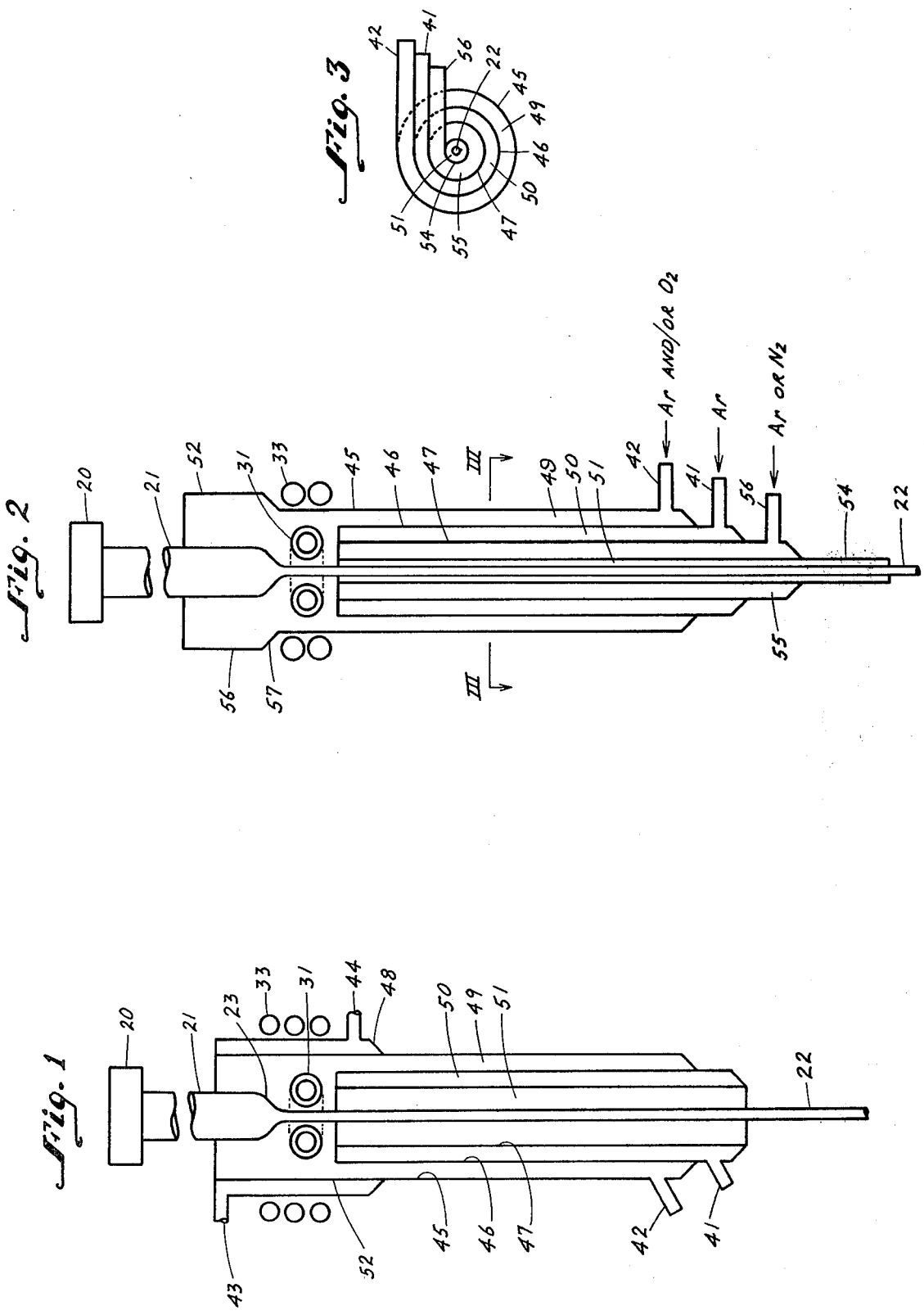

OPTICAL FIBER DRAWING USING PLASMA TORCH

BACKGROUND OF THE INVENTION

This invention relates to improvements in optical fiber manufacture. More specifically, the invention relates to a method and apparatus for providing improved fiber drawing from an optical preform.

In the state-of-the-art optical fiber drawing from an optical preform, it is necessary to heat a portion of the preform to its "drawing temperature". A filament of glass is pulled from the heated portion of the preform to form an optical fiber using conventional heating sources such as $CO_2$ laser, resistance or induction furnace and $O_2/H_2$ torches. The desired light transmitting characteristics and mechanical properties can be given to the fiber by carefully regulating the diameter of the fiber drawn from the preform. In order to provide an optical fiber having uniform light transmission characteristics along its length, it is imperative that the diameter of the fiber be maintained constant along the length of the fiber. Additional factors such as the fiber drawing temperature and tension, the rate of drawing and the protection of the drawn fiber, all affect the optical characteristics of the drawn fiber.

The fiber drawing tension significantly affects the optical transmission properties of the final glass fiber. Since drawing temperature affects both optical and mechanical properties of the drawn fiber, optimum drawing temperature must be employed to obtain the ideal fiber having the desired properties. The drawing temperature is associated with other fiber drawing parameters, such as drawing speed, preform and fiber diameter, and preform feed speed. Therefore, the fiber drawing tension, which is mainly dependent on the drawing temperature, should be carefully controlled. So, for instance, drawing tension approaching 50 grams may be used for drawing very low loss optical fibers.

On the other hand, low drawing tension, for instance, of less than 5 grams may be maintained during drawing of long lengths of high strength fiber. The low drawing tension is achieved by utilizing a high drawing temperature. However, high drawing temperature causes a high degree of silica vaporization. The upper limit of the drawing temperature with regard to optimum drawing tension depends on drawing conditions.

It is important in drawing optical fibers to assure that the heat flux into the preform at the portion from which the fiber is being drawn be as constant as possible not only in the course of the drawing operation, but also from point to point of the circumference of the preform at the respective cross section, since the viscosity and thus the flow rate of the material of the preform into the fiber is dependent thereon. Should the heat flux into the preform and thus the temperature and viscosity of the material of the preform vary in the circumferential direction of the particular cross section, the cross section of the drawn fiber would be irregular rather than circular, with attendant deterioration of the light transmitting properties of the fiber. A clean drawing atmosphere should be maintained by using a clean room facility which is frequently inspected using a dust particle counter. One of the sources of contaminations on the fiber surface resulting in fiber strength degradation may be the heat source itself which may generate foreign particles from heating elements such as carbon and zirconia particles in commonly widely-used resistance or induction furnaces. A typical economical clean heat source is an oxyhydrogen flame torch in which filtered oxygen and hydrogen gases are mixed and ignited to form a oxyhydrogen flame. The torch configuration is optimized for providing uniform heat flux resulting in the formation of a neck-down portion during fiber drawing using relatively large outer diameter preforms.

In conventional constructions of drawing arrangements using the oxygydrogen flame torch, heat flux from the flame into the preform is irregular, owing both to environmental influences, such as ambient air currents, and to the shape of the flame. To ameliorate this drawback, it has been proposed to use a plurality of oxyhydrogen flame torches which are distributed around the axis of the preform and directed against the portion which is to be heated to make the material thereof flowable for the drawing operation. Yet, even here, the heat flux into the preform varies from one point of the circumference to the other; therefore relative angular displacement about the drawing axis is often conducted between the preform and the torch or torches, so that the amount of heat transmitted to the preform at the particular point of its circumference is averaged over time. However, the need for such relative angular displacement complicates the structure of the drawing arrangement and brings about other problems which are reflected in the quality of the drawn fiber.

SUMMARY OF THE INVENTION

Accordingly, it is a general object of the present invention to avoid the disadvantages of the conventional heating sources used in drawing optical fibers from a preform.

More particularly, it is an object of the present invention to develop a heating source for the above use which does not possess the drawbacks of the conventional heating sources of this type.

A further object of the present invention is so to construct the heating source as to avoid the need for relative angular displacement about the drawing axis between the source and the preform from which the uniform dimensional optical fiber is being drawn.

In pursuance of these objects and others which will become apparent hereafter, one feature of the present invention resides in a heating arrangement for use in drawing an optical fiber from a preform, comprising means for maintaining an atmosphere of plasma-forming gaseous medium, such as argon or mixture of argon and oxygen, in a heating zone receiving a portion of the preform from which the fiber is to be drawn during the fiber-drawing operation; and means for exciting in the atmosphere present in the heating zone a ring-shaped plasma circumferentially surrounding the portion of the preform.

A particular advantage of this construction is that the annular plasma constitutes a clean heat source having a very uniform heat output as considered both over the circumference of the plasma and in time, at least after an initial warming-up interval. Moreover, the plasma can be confined only to the desired heating zone and those portions of the preform and of the heating arrangement, and particularly of the fiber, which are not to be heated can be protected from the heating effects of the plasma. An additional advantage of using the plasma is that it does not produce any by-products which would require complicated treatment or constitute an environmental burden. The annular or doughnut-shaped configuration of the plasma assures that the material of the drawn fiber will not melt.

An advantageous construction of the heating arrangement of the present invention is obtained when the maintaining means includes means for forming an annular stream of the plasma-forming gaseous medium flowing through the heating zone. In this manner, the supply of the plasma-forming gaseous medium in the heating zone is continuously replenished. In this construction, it is advantageous when the forming means includes a plasma torch having at least two tubular elements centered on a common axis and one surrounding the other to bound therewith an annular flow passage having an upstream end remote from and a downstream end opening into the heating zone for the flow of the plasma-forming gaseous medium therethrough while the other tubular element bounds an internal passage for substantialy coaxial advancement of the fiber being drawn therethrough, and when the forming means further includes at least one inlet port for admitting the plasma-forming gaseous medium into the upstream portion of the flow passage.

In accordance with another aspect of the invention, there is provided means for shielding the plasma from environmental influences, so that no instability will be introduced into the plasma. Advantageously, the shielding means includes an additional tubular element coaxially surrounding the one tubular element and having an extension which extends in the downstream direction beyond the downstream end of the flow passage to circumferentially surround at least the heating zone.

It is also advantageous when the plasma torch includes means for cooling at least the extension of the additional tubular element form the exterior thereof. Such cooling means advantageously includes means for defining a cooling chamber outwardly circumferentially surrounding at least the extension of the additional tubular element, and means for circulating a fluid coolant through the cooling chamber. The circulating means may include means for admitting a cooling liquid into and withdrawing the same from the cooling chamber.

According to a further development of the invention, the shielding means includes means for passing an annular stream of a shielding gaseous medium coaxially around the plasma. The shielding gaseous medium is advantageously selected from the group consisting of argon, oxygen, nitrogen and mixtures thereof. The passing means preferably includes the above-mentioned additional tubular element, with or without the extension. When the additional tubular element has the extension, this extension will confine the flow of the shielding gaseous medium past the heating zone and will be cooled thereby. It is currently preferred for the extension to have a diameter exceeding that of the remainder of the additional tubular element.

To assure that the plasma will have the desired annular or doughnut shape, there may further be provided means for introducing a stream of a cooling gas, especially nitrogen, between the heating zone and the preform for the cooling gas to coaxially surround the preform. Such introducing means advantageously includes means for inducing a flow of the cooling gas through the internal passage around the fiber being drawn and into the center of the heating zone. In order to avoid the possibility that the drawn fiber could be unduly cooled by the cooling gas, the introducing means advantageously includes a further tubular element accommodated in the internal passage and subdividing the same into an inner passage for the fiber and an annular coaxial outer passage for the cooling gas, and the inducing means includes means for admitting the cooling gas into the outer passage for flow longitudinally thereof toward and into the center of the heating zone.

The present invention also relates to a method of heating a portion of a preform from which an optical fiber is to be drawn in a fiber-drawing operation, this method comprising the steps of maintaining an atmosphere of plasma-forming gaseous medium in a heating zone surrounding the portion of the preform from which the fiber is to be drawn during the fiber-drawing operation; and exciting in the atmosphere present in the heating zone a ring-shaped plasma circumferentially surrounding the portion of the preform. The maintaining step advantageously includes forming an annular stream of the plasma-forming gaseous medium flowing through the heating zone.

The method may further include the steps of passing an annular stream of a shielding gaseous medium coaxially around the plasma, externally confining the stream of the shielding gaseous medium, and introducing a stream of a cooling gas between the heating zone and the portion of the preform to coaxially flow past the latter.

BRIEF DESCRIPTION OF THE DRAWING

Above-mentioned and other features and objects of this invention will become more apparent by reference to the following description taken in conjunction with the accompanying drawing, in which:

FIG. 1 is an axial sectional view of a plasma torch of the present invention in use;

FIG. 2 is a view similar to FIG. 1 but of an improved version of the plasma torch; and FIG. 3 is a cross-sectional view taken on line III–III of FIG. 2.

DETAILED DESCRIPTION OF THE PREFERRED EMBODIMENT

Referring to the drawing, and first to FIG. 1, it may be seen that the reference number 21 identifies an optical preform suspended from an appropriate support 20 which causes the preform 21 to be maintained in a proper position for drawing of an optical fiber 22 therefrom. Proper drawing position requires that a tapering region or portion 23 of the preform 21 be maintained near a plasma 31 which is induced as a result of passage of high-frequency electric current through coils 33. A frequency of for instance 23 MHz will result in induction of the appropriate ring-shaped plasma 31. The optical fiber 22 is drawn from the preform 21 by drawing equipment which is of a conventional construction and hence has been omitted from the drawing. Plasma sustaining gas, such as argon or a mixture of argon and oxygen, is introduced through an inlet port 41 into an inner one of two concentric flow passages 49 and 50 which exist between an outer tube 45, a central tube 46 and an inner tube 47. The fiber 22 passes through an internal passage 51 of the inner tube 47.

The high temperatures associated with the plasma 31 require some form of cooling for an upper neck region or extension 52 of the outer tube 45. Thus, in accordance with a currently preferred concept of the present invention, shielding gas is admitted through an inlet port or nipple 42 into the annular flow passages 49 existing between the intermediate tube 46 and the outer tube 45. The shielding and plasma-forming gases pass upwards through the respective concentric flow passages 50, 49 and enter the region of the ring plasma 31. If desired, and provided that this will not adversely affect the optomechanical properties of the fiber 22, cooling gas, such as nitrogen, can be introduced through the central passage 51 into the central region of the plasma 31 to separate the same especially from the already drawn fiber 22 to avoid melting of the latter.

In some instances, it may be desired to provide for additional cooling. Thus, as shown in the drawing, there may be provided a short large diameter tube 48 which surrounds the neck region 52 to form therewith a cooling chamber 53 which may be upwardly open or closed. A cooling fluid such as water is admitted into the cooling chamber 53 through an inlet 44 and discharged therefrom through an outlet 43. This circulating water maintains the neck temperature at a low level. This prevents melting of the nozzle or neck region 52 of the plasma torch apparatus.

Under certain operating conditions, it may be possible to reverse the positions of the streams of the gaseous media, that is, the plasma-forming gaseous medium can be admitted into the flow passage 49 and the shielding gaseous medium can be admitted into the flow passage 50 to now protect the preform 21 or its portion 23 from excessive heating by the plasma 31. Of course, under these circumstances, the cooling of the extension 52 will have to be accomplished in a different manner than by shielding gaseous medium, for instance, by the above-discussed water cooling.

However, it is also possible and contemplated by the present invention to provide for the cooling of the outer tubular element 45 and/or its extension 52 by a gaseous cooling medium simultaneously with cooling the preform 21 and/or its portion 23 by the shielding gaseous medium without having to introduce the innermost stream of gaseous medium through the passage 51. A plasma torch suited for accomplishing this purpose is illustrated in FIG. 2 of the drawing, wherein the same reference numerals as before have been used to identify corresponding elements and parts.

As shown in FIG. 2, the plasma torch now includes, in addition to the tubular elements 45, 46 and 47 an additional tubular element 54 which is partially received in the tubular element 47 and is coaxially surrounded by the latter to form an additional flow passage 55 therewith. A cooling gas, such as argon or nitrogen, is admitted into the flow passage 55 through an inlet port or nipple 56. This cooling gas, after emerging from the flow passage 55, flows past the drawing portion 23 of the preform 21, thus cooling the same and protecting it from the effects of excessive heating by the plasma 31. The fiber 22 is drawn through the passage 51 which is separated from the flow passage 55 by the additional tubular element 54. In this manner, the freshly drawn fiber 22 is protected from the effects of excessive cooling thereof by the stream of the cooling gas once it leaves the heating zone containinig the plasma 31.

FIG. 2 also illustrates that the extension 52 of the outermost tubular element 45 may include a cylindrical portion 56 having a diameter exceeding that of the remainder of the tubular element 45, and a substantially conical transition region 57 connecting the cylindrical portion 56 of the extension 52 with the remainder of the tubular element 45. The transition region 57 is situated downstream of the heating zone containing the plasma 31, followed in the downstream direction by the enlarged cylindrical portion 56. In this manner, the flow-through cross-sectional area of the torch may be increased downstream of the heating zone, resulting in a reduction in the speed of flow of the gaseous medium through this region, whereby the dwell time of the gaseous medium in this region, and thus the amount of heat transferred to a volume unit of this gaseous medium from the extension 52, are increased.

In order to obtain the desired plasma flame configuration, the eddy current pattern must be controlled by optimizing the RF generator input power and gas flow rate. These paramaters must be carefully adjusted to insure that a ring plasma is obtained. An example of the parameters suitable for obtaining a ring plasma may be, for instance, as follows: The RF generator had a power output equal to about 10-11% of its maximum 20 kilowatts when only argon was used as the plasma forming gas. The grid current was approximately 110 mA; the plate voltage was approximately 5.8 kilovolts; the plate current was approximately 0.4 amps and the frequency was 23.6 MHz. The power output of the RF source was increased to about 12 to 13% when a 50—50 mixture of argon and oxygen was used as the plasma-forming gaseous medium.

In the plasma torch configuration of FIG. 2, the tubular elements 45, 46, 47 and 54 had the following dimensions: the outermost tubular element 45: its main portion an outer diameter of 28 mm and a wall thickness of 1.0 mm and its extension 52 an outer diameter of 35 mm; the next inwardly following tubular element 46: an outer diameter of 25 mm and a wall thickness of 1.0 mm; the inwardly adjacent tubular element 47: an outer diameter of 12 mm and a wall thickness of 1.0 mm; and the innermost tubular element 54: an outer diameter of 7 mm and a wall thickness of 1.0 mm. Similar dimensions were used in the plasma torch of FIG. 1 as well. In the plasma torch the plasma-forming gases argon or mixture of argon and oxygen had flow rates of: argon 0.5 to 1.0 liter/minute at a pressure of 20 p.s.i.g. and/or oxygen 0.5 to 1.0 liter/minute at a pressure of 25 p.s.i.g. for a total flow of about 1.0 liter/minute; coolant gas in the flow passage 49: argon 12.0 to 17.0 liters/minute at a pressure of 20 p.s.i.g. and/or oxygen 5.0 to 10.0 liters/minute at a pressure of 25 p.s.i.g. for a total flow of about 17 liters/minute; and coolant gas in the flow passage 55: argon or nitrogen about 2 to 3 liters/minute at a pressure of 20 p.s.i.g.

The inlet nipples 41, 42 and/or 56 had an outer diameter of about 4 mm with a wall thickness of about 1 mm. In order to obtain a uniformly distributed flow of the various gaseous media from the respective flow passages 49, 50 and/or 55 into the heating zone, the nipples 42, 41 and/or 56 were oriented substantially tangentially of the respective flow passages 49, 50 and/or 55, as shown in FIG. 3. In this manner, the respective gaseous media enter the respective passages 49, 50 and/or 55 with a component of movement only or predominantly in the circumferential direction, so that the gaseous media are uniformly distributed over the cross sections of the respective passages 49, 50 and/or 55 at the upstream ends thereof, while the movement of such gaseous media toward the heating zone is caused exclusively or predominantly by the pressure differential between the upstream ends of the passages 49, 50 and/or 55 and the heating zone, whereas the circumferential component of motion is substantially suppressed or eliminated altogether before the respective gaseous medium reaches the downstream end of the respective flow passage 49, 50 or 55. Thus, the plasma 31 is formed in an undisturbed environment.

While the ports or nipples 41, 42 and 56 are shown in FIG. 3 to be so positioned as to impart the same sense of spin to the respective gaseous media emerging from it into the respective passages 50, 49 and 55, it is aslo contemplated to change the orientation of one of the nipples 41, 42 and 56, especially the first one, so that a spin of the opposite direction will be imparted thereby.

A ring-shaped plasma flame possesses a lower temperature zone in the center of the ring than around the doughnut shape, so that the preform 21 and especially the freshly drawn fiber 22 are not excessively heated.

While we have described above the principles of our invention in connection with specific apparatus, it is to be clearly understood that this description is made only by way of example and not as a limitation to the scope of our invention as set forth in the objects thereof and in the accompanying claims.

We claim:

1. A heating arrangement for use in drawing an optical fiber from a portion of a preform, comprising
    means for maintaining an atmosphere of plasma-forming gaseous medium in a heating zone receiving said portion of the preform; and
    means for exciting in the atmosphere present in said heating zone a ring-shaped plasma circumferentially surrounding said portion of the preform.

2. The heating arrangement as defined in claim 1, wherein
    said maintaining means includes means for forming an annular stream of said plasma-forming gaseous medium flowing through said heating zone.

3. The heating arrangement as defined in claim 2, wherein
    said forming means includes a plasma torch having at least two tubular elements centered on a common axis and one surrounding the other to bound therewith an annular flow passage having an upstream end remote from and a downstream end opening into said heating zone for the flow of said plasma-forming gaseous medium therethrough while said other tubular element bounds an internal passage for substantially coaxial advancement of the fiber being drawn therethrough, said forming means further including at least one inlet port for admitting said plasma-forming gaseous medium into said upstream portion of said flow passage.

4. The heating arrangement as defined in claim 3, and further comprising
    means for shielding the plasma from environmental influences.

5. The heating arrangement as defined in claim 4, wherein
    said shielding means includes an additional tubular element coaxially surrounding said one tubular element and having an extension which extends in the downstream direction beyond said downstream end of said flow passage to circumferentially surround at least said heating zone.

6. The heating arrangement as defined in claim 5, and further comprising
    means for cooling at least said extension of said additional tubular element from the exterior thereof.

7. The heating arrangement as defined in claim 6, wherein
    said cooling means includes means for defining a cooling chamber outwardly circumferentially surrounding at least said extension of said additionally tubular element, and means for circulating a fluid coolant through said cooling chamber.

8. The heating arrangement as defined in claim 7, wherein
    said circulating means includes means for admitting a cooling liquid into and withdrawing the same from said cooling chamber.

9. The heating arrangement as defined in claim 4, wherein
    said shielding means includes means for passing an annular stream of a shielding gaseous medium coaxially around said plasma.

10. The heating arrangement as defined in claim 9, wherein
    said passing means includes an additional tubular element coaxially surrounding said one tubular element and bounding therewith an additional flow passage having an upstream end remote from and a downstream end surrounding said downstream end of said flow passage for the flow of said shielding gaseous medium therethrough, said passing means further including at least one additional inlet port for admitting said shielding gaseous medium into said upstream end of said additional flow passage.

11. The heating arrangement as defined in claim 10, wherein
    said shielding means further includes an extension of said additional tubular element which extends in the downstream direction beyond said downstream end of said flow passage to circumferentially surround at least said heating zone and to confine the flow of said shielding gaseous medium past said heating zone and be cooled thereby.

12. The heating arrangement as defined in claim 11, wherein
    said extension has a diameter exceeding that of the remainder of said additional tubular element.

13. The heating arrangement as defined in claim 11, and further comprising
    means for additionally cooling at least said extension of said additional tubular element from the exterior thereof.

14. The heating arrangement as defined in claim 13, wherein
    said additional cooling means includes means for defining a cooling chamber outwardly circumferentially surrounding at least said extension of said additional tubular element, and means for circulating a fluid coolant through said cooling chamber.

15. The heating arrangement as defined in claim 14, wherein
    said circulating means includes means for admitting a cooling liquid into and withdrawing the same from said cooling chamber.

16. The heating arrangement as defined in claim 9, and further comprising
    means for introducing a stream of a cooling gas between said heating zone and the preform for the cooling gas to coaxially surround the latter.

17. The heating arrangement as defined in claim 16, wherein
    said introducing means includes means for inducing a flow of said cooling gas through said internal passage around the fiber being drawn and into the center of said heating zone.

18. The heating arrangement as defined in claim 17, wherein said introducing means includes a further tubular element accommodated in said internal passage and subdividing the same into an inner passage for the fiber and an annular coaxial outer passage for the cooling gas; and wherein said inducing means includes means for admitting the cooling gas into said outer passage for flow longitudinally thereof toward and into the center of said heating zone.

19. A method of heating a portion of a preform from which an optical fiber is to be drawn in a fiber-drawing operation, comprising the steps of maintaining an atmosphere of plasma-forming gaseous medium in a heating zone surrounding said portion of the preform; and exciting in the atmosphere present in the heating zone a ring-shaped plasma circumferentially surrounding said portion of the preform.

20. The method as defined in claim 19, wherein said plasma-forming gaseous medium is argon.

21. The method as defined in claim 19, wherein said plasma-forming gaseous medium is a mixture of argon and oxygen.

22. The method as defined in claim 19, wherein said maintaining step includes forming an annular stream of the plasma-forming gaseous medium flowing through the heating zone.

23. The method as defined in claim 19, and further comprising the step of passing an annular stream of shielding gaseous medium coaxially around the plasma.

24. The method as defined in claim 23, and further comprising the step of externally confining the stream of the shielding gaseous medium.

25. The method as defined in claim 23, wherein said shielding gaseous medium is selected from the group consisting of argon, oxygen, nitrogen and mixtures thereof.

26. The method as defined in claim 19, and further comprising the step of introducing a stream of a cooling has between the heating zone and the portion of the preform to coaxially flow past the latter.

27. The method as defined in claim 26, wherein said cooling gas is nitrogen.

* * * * *